US012567312B2

(12) United States Patent
Acres

(10) Patent No.: US 12,567,312 B2
(45) **Date of Patent: *Mar. 3, 2026**

(54) PLAYER-FUNDED LOSS AMELIORATION

(71) Applicant: Acres Technology, Las Vegas, NV (US)

(72) Inventor: John F. Acres, Las Vegas, NV (US)

(73) Assignee: Acres Technology, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/339,720

(22) Filed: Jun. 22, 2023

(65) Prior Publication Data

US 2024/0029515 A1 Jan. 25, 2024

Related U.S. Application Data

(63) Continuation of application No. 17/237,345, filed on Apr. 22, 2021, now Pat. No. 11,727,757.

(51) Int. Cl.
*G07F 17/32* (2006.01)

(52) U.S. Cl.
CPC ...... *G07F 17/3258* (2013.01); *G07F 17/3239* (2013.01); *G07F 17/3262* (2013.01); *G07F 17/3267* (2013.01)

(58) Field of Classification Search
CPC ............. G07F 17/3239; G07F 17/3244; G07F 17/3255; G07F 17/3258; G07F 17/3262; G07F 17/3267; G07F 17/34
See application file for complete search history.

(56) References Cited

U.S. PATENT DOCUMENTS

| | | | |
|---|---|---|---|
| 4,072,930 | A | 2/1978 | Lucero et al. |
| 4,258,838 | A | 3/1981 | Rockola et al. |
| 4,283,709 | A | 8/1981 | Lucero et al. |
| 4,335,809 | A | 6/1982 | Wain |
| 4,467,424 | A | 8/1984 | Hedges et al. |
| 4,624,459 | A | 11/1986 | Kaufman |
| 4,636,951 | A | 1/1987 | Harlick |
| 4,652,998 | A | 3/1987 | Koza et al. |
| 4,679,143 | A | 7/1987 | Hagiwara |
| 4,760,247 | A | 7/1988 | Keane et al. |
| 4,775,937 | A | 10/1988 | Bell |
| 4,837,728 | A | 6/1989 | Barrie et al. |
| 4,964,638 | A | 10/1990 | Ishida |
| 4,991,848 | A | 2/1991 | Greenwood et al. |
| 5,038,022 | A | 8/1991 | Lucero |
| 5,042,810 | A | 8/1991 | Williams |
| 5,096,195 | A | 3/1992 | Gimmon |
| 5,103,081 | A | 4/1992 | Fisher et al. |
| 5,123,649 | A | 6/1992 | Tiberio |

(Continued)

FOREIGN PATENT DOCUMENTS

| | | | |
|---|---|---|---|
| AU | 27572/84 | A | 11/1984 |
| AU | 71194/91 | A | 8/1991 |

(Continued)

*Primary Examiner* — Milap Shah
(74) *Attorney, Agent, or Firm* — Ballard Spahr LLP

(57) ABSTRACT

Embodiments of the present invention are directed to methods and systems in which a player's wagers accrue in a pool that can be awarded to the player as a bonus as a function of a defined loss threshold on an electronic gaming machine. The volatility of the bonus awards is adjustable.

20 Claims, 7 Drawing Sheets

(56) References Cited

U.S. PATENT DOCUMENTS

| | | | |
|---|---|---|---|
| 5,179,517 | A | 1/1993 | Sarbin et al. |
| 5,217,224 | A | 6/1993 | Sincock |
| 5,249,800 | A | 10/1993 | Hilgendorf et al. |
| 5,257,179 | A | 10/1993 | DeMar |
| 5,280,909 | A | 1/1994 | Tracy |
| 5,344,144 | A | 9/1994 | Canon |
| 5,370,306 | A | 12/1994 | Schulze et al. |
| 5,429,361 | A | 7/1995 | Raven et al. |
| 5,470,079 | A | 11/1995 | LeStrange et al. |
| 5,494,287 | A | 2/1996 | Manz |
| 5,580,309 | A | 12/1996 | Piechowiak et al. |
| 5,586,936 | A | 12/1996 | Bennett et al. |
| 5,836,817 | A | 11/1998 | Acres et al. |
| 7,758,419 | B2 | 7/2010 | Rowe et al. |
| 8,474,823 | B2 | 7/2013 | Matthews et al. |
| 11,727,757 | B2 * | 8/2023 | Acres .................. G07F 17/3262 463/25 |
| 2002/0193162 | A1 | 12/2002 | Walker et al. |
| 2003/0004871 | A1 | 1/2003 | Rowe |
| 2003/0064807 | A1 | 4/2003 | Walker et al. |
| 2003/0224852 | A1 | 12/2003 | Walker et al. |
| 2004/0048644 | A1 | 3/2004 | Gerrard et al. |
| 2006/0121972 | A1 | 6/2006 | Walker et al. |
| 2008/0026816 | A1 | 1/2008 | Sammon et al. |
| 2008/0076576 | A1 | 3/2008 | Graham et al. |
| 2009/0124332 | A1 | 5/2009 | Baerlocher |
| 2009/0124346 | A1 | 5/2009 | Baerlocher |
| 2009/0227354 | A1 | 9/2009 | Johnson |
| 2009/0305770 | A1 | 12/2009 | Bennett et al. |
| 2013/0196748 | A1 | 8/2013 | Nicely et al. |
| 2013/0296013 | A1 | 11/2013 | Dunbar |
| 2013/0331181 | A1 | 12/2013 | Newton et al. |
| 2013/0337904 | A1 * | 12/2013 | De Waal ............. G07F 17/3258 463/27 |
| 2014/0057705 | A1 | 2/2014 | Elias et al. |
| 2014/0087801 | A1 | 3/2014 | Nicely et al. |

FOREIGN PATENT DOCUMENTS

| | | | |
|---|---|---|---|
| AU | 647234 | B2 | 3/1994 |
| AU | 2009248436 | A1 | 1/2010 |
| GB | 2211975 | A | 7/1989 |

* cited by examiner

PLAYER-FUNDED LOSS AMELIORATION

CROSS REFERENCE TO RELATED PATENT APPLICATIONS

This application is a continuation of U.S. patent application Ser. No. 17/237,345 filed Apr. 22, 2021, which is hereby incorporated by reference in its entirety.

FIELD OF THE INVENTION

This disclosure relates generally to gaming systems, and more particularly to bonuses for gaming systems.

BACKGROUND

Gaming systems are designed around the thrill of winning. Gamblers wager something of value, i.e. money or credits, for the chance to win even more. Personal preferences abound regarding styles of gaming, however. Some prefer to play for a relatively long time without much change in their holdings. For example, some players prefer to start with a certain size "bank" of credits, and enjoy winning and losing relatively small amounts compared to their bank, or their individual game wagers, over time. These players may wager only a few credits, repeatedly, and prefer such low-volatility games that do not typically award extremely high wins, but award them relatively frequently.

Other players find more thrill with volatile style of play. Such players will often bet the "max" bet and will sustain losses for a relatively long time, or in a relatively large amount in comparison to their wagers or credit bank, in search of the big payoff.

This chance of loss is important for both entertainment reasons and to allow the game operator to profit. By providing wins and losses of varying amounts, depending on game outcome but according to a known paytable, an advantage to the game operator can be ensured over a statistically significant large number of games. Individual players may win or lose any game, or gaming session, but, over a long period of time, the odds statistically favor the house. This "house advantage" is important because it allows the game operator to operate a business that offers the games for the enjoyment of the customers.

Regardless of the volatility designed into the game, winning results are completely unpredictable. That is, the chance of a winning result is the same after each play. With random results such as those using typical RNG-based games, there is the chance that a player will not obtain a winning result for a long time. When this happens, a player may become discouraged and never choose to play again. Further, many players grow frustrated if there is a long period of play between wins. Other players prefer to have longer periods between winning events but to have winning events that are larger or occur in clusters.

Most casinos track play of all identified players on each gaming machine. To do so, the casino offers each player membership in a players' club, which allows players to identify themselves when they start play on an electronic gaming machine. This is traditionally done by issuing the player a card that he or she inserts into a card reader associated with the electronic gaming machine. More recently, the player installs an app on their phone that permits wireless identification of the player at the gaming machine. Or it could be done with a personal identification number (PIN). The gaming machines are typically networked together so that amounts wagered by each identified player during a gaming session on any of the gaming machines where the player is identified can be transmitted over the network to a server that tracks these amounts.

The casino uses the tracked amounts in marketing efforts such as awarding points that can be redeemed for play credits, mailers to players that are written based on the play level, comps, etc. A problem associated with this approach is that all players are grouped together by amounts wagered, and the benefits for a particular wagering level are awarded accordingly. This does not take into account whether a player is generally winning, perhaps large amounts, or generally losing—also possibly large amounts. The casino would be better served by providing more of the marketing benefits to players who are losing, and thus may be disaffected, and fewer benefits to winning players, who presumably are pleased with their play results.

Most player-tracking systems, however, do not track wins and losses during game play. They merely track coin-in and coin-out meter readings at the start, i.e., card-in, and end, i.e., card-out, of each gaming session on a gaming machine. Coin-in is the amount wagered by the player, and coin-out is the amount paid to the player in wins or bonuses. These systems are unable to determine whether the player is on a winning or losing streak during the session.

A long losing streak is especially problematic for a player who is new to the casino, e.g., one who recently joined the players' club. Studies have shown that the first few gaming sessions in a new venue have a large bearing on whether the player will return for more play. New players who suffer losing streaks or losses generally are much less likely to return for more play.

There are several technical problems that result from the foregoing. First, the random nature of game outcomes might produce a long losing streak, which discourages the player. Second, there might be a volatility mismatch between the machine and the player. In other words, a player who prefers frequent smaller wins might be matched with a machine having a high volatility or vice versa. The player's volatility preference can be specified in a record associated with the player in the players' club or may be inferred from their behavior during game play if the player-tracking system has the capability of tracking play during a session. In addition, if the casino desires to bonus a player having an unsatisfactory gaming experience, bonus awards are typically paid from the casino's marketing budget, thus impacting the bottom line.

Embodiments of the invention address these and other limitations of the prior art.

DETAILED DESCRIPTION

Figure 1:
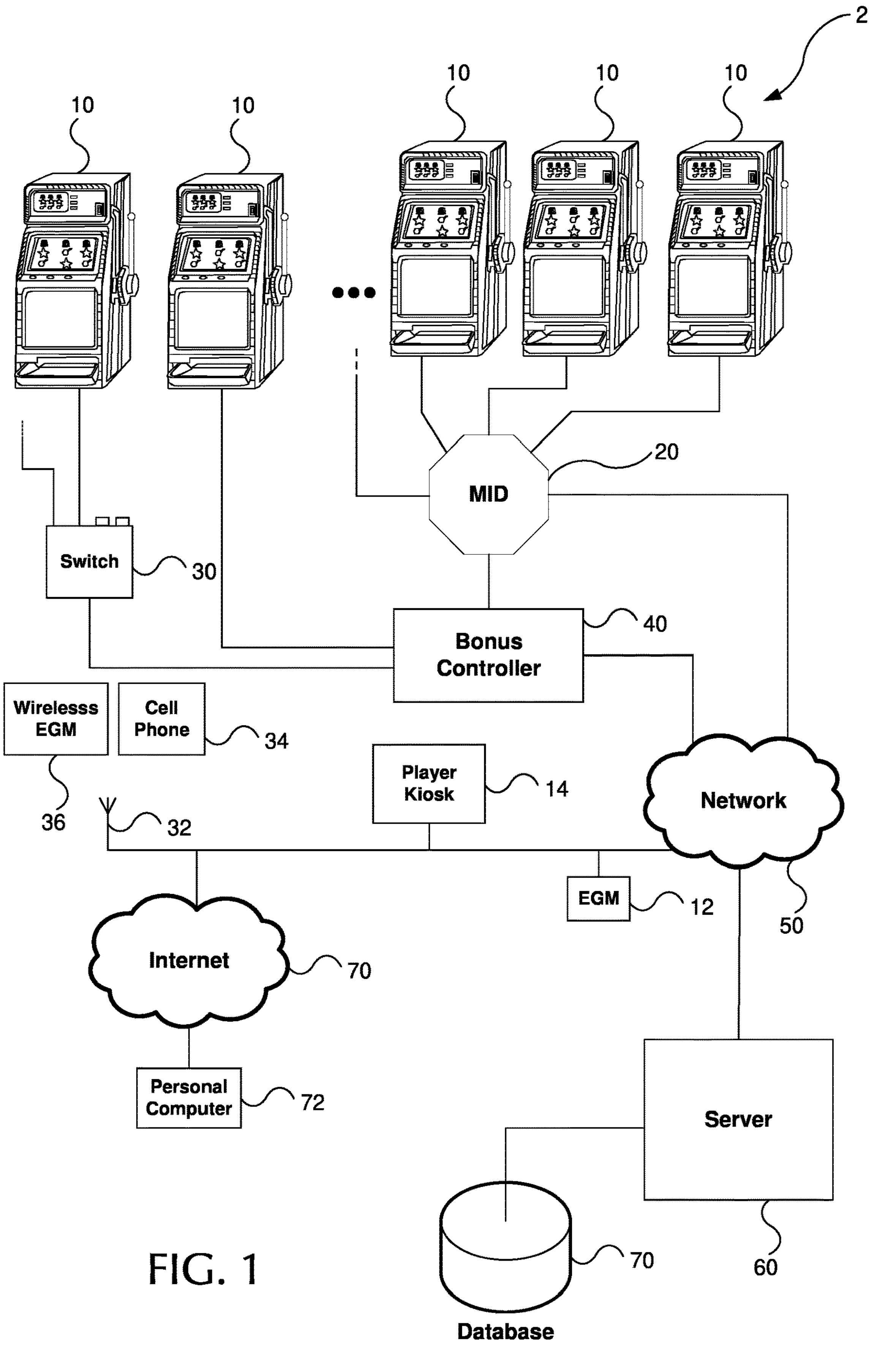
FIG. 1 is a system diagram illustrating various components of a gaming system according to embodiments of the invention.

FIG. 1 is a system diagram illustrating various components of a gaming system according to embodiments of the invention. Referring to FIG. 1, the gaming system 2 includes several gaming devices, also referred to as Electronic Gaming Machines (EGMs) 10 that are connected to a gaming network 50 through various communication mechanisms.

In general, a gaming network 50 connects any of a number of EGMs 10, or other gaming devices, such as those described below, for central management. Accounting and other functions may be served by a connected server 60 and database 70. For example, many player tracking functions, bonusing systems, and promotional systems may be centrally administrated from the server 60 and database 70. In some embodiments there may be multiple servers 60 and databases 70, each performing different functions. In other embodiments functions may be combined and operate on a single or small group of servers 60, each with their own database 70 or combined databases.

Many of the EGMs 10 of FIG. 1 connect to the gaming network 50 through a Machine Interface Device, MID 20. In general, the MID 20 is a multi-protocol interface that monitors communication between the gaming network 50 and the EGM 10. In a common embodiment, the MID 20 communicates to the EGM 10 through a standard gaming network port, using a standard gaming network protocol, SAS, which is well known in the gaming industry. Most modern games include at least one communication port, which is commonly a SAS port or a port for another communication protocol. The MID 20, along with its various functions and communication methods is described in detail with reference to FIGS. 3A and 3B below.

Other EGMs 10 in FIG. 1 connect to the gaming network 50 through a bonus controller 40, which may be coupled between the gaming network 50 and gaming device 10. The bonus controller 40 generally communicates through a non-SAS protocol, such as another well-known communication protocol known as GSA. GSA is typically carried over an Ethernet network, and thus the bonus controller 40 includes an Ethernet transceiver, which is described with reference to FIG. 4 below. Because the bonus controller 40 communication may be Ethernet based, a switch 30 may be used to extend the number of devices that may be coupled to the bonus controller 40. The bonus controller 40 and/or the MID 20 may create or convert data or information received according to a particular protocol, such as SAS, into data or information according to another protocol, such as GSA. In this way the MID 20 and bonus controller 40 are equipped to communicate, seamlessly, between any EGM 10 and gaming network 50 no matter which communication protocols are in use. Further, because the MID 20 and bonus controller 40 are programmable, and include multiple extensible communication methods, as described below, they are capable of communicating with EGMs 10 that will communicate using protocols and communication methods developed in the future. The functions implemented by any of the controllers mentioned herein might be distributed among a plurality of controllers.

Other games or devices on which games may be played are connected to the gaming network using other connection and/or communication methods. For instance, an EGM 12 may couple directly to the network 50 without any intervening hardware, other than hardware that is built into the EGM 12 to connect it to the network 50. Likewise, a player kiosk 14 may be directly coupled to the gaming network. The player kiosk 14 allows players, managers, or other personnel to access data on the gaming network 50, such as a player tracking record, and/or to perform other functions using the network. For example, a player may be able to check the current holdings of the player account, transfer balances, redeem player points for credits, cash, or other merchandise or coupons, such as food or travel coupons, for instance.

A wireless transceiver 32 couples the gaming network 50 to a wireless EGM 36, such as a handheld device, or, through a cell phone or other compatible data network, the transceiver 32 connects to a cellular phone 34. The cellular phone 34 may be a "smart phone," which in essence is a handheld computer capable of playing games or performing other functions on the gaming network 50, as described in some embodiments of the invention.

The gaming network 50 also couples to the internet 70, which in turn is coupled to a number of computers, such as the personal computer 72 illustrated in FIG. 1. The personal computer 72 may be used much like the kiosk 14, described above, to manage player tracking or other data kept on the gaming network 50. More likely, though, is that the personal computer 72 is used to play actual games in communication with the gaming network 50. Player data related to games and other functions performed on the personal computer 72 may be tracked as if the player were playing on an EGM 10.

In general, in operation, a player inserts a starting credit into one of the games, such as an EGM 10. The EGM 10 sends data through its SAS or other data communication port through the MID 20 and/or bonus controller 50 to the gaming network 50. Various servers 60 and databases 70 collect information about the gameplay on the EGM 10, such as wagers made, results, various pressing of the buttons on the EGM 10, for example. In addition, the SAS port on the EGM 10 may also be coupled, through the MID 20 as described below, to other systems, such as player tracking systems, accounting, and ticketing systems, such as Ticket-In-Ticket-Out (TITO) systems.

In addition, the EGM 10 accepts information from systems external to the EGM itself to cause the EGM 10 to perform other functions. For example, these external systems may drive the EGM 10 to issue additional credits to the player. In another example, a promotional server may direct the EGM 10 to print a promotional coupon on the ticket printer of the EGM.

The bonus controller 40 is structured to perform some of the above-described functions as well. For example, in addition to standard games on the EGM 10, the bonus controller 40 is structured to drive the EGM 10 to pay bonus awards to the player based on any of the factors, or combination of factors, related to the EGM 10, the player playing the EGM 10, particular game outcomes of the game being played, or other factors.

In this manner, the combination of the bonus controller 40 and MID 20 are a sub-system capable of interfacing with each of the EGMs on a gaming network 50. Through this interface, the MID 20 may gather data about the game, gameplay, or player, or other data on the EGM 10, and forward it to the bonus controller 40. The bonus controller 40 then uses such collected data as input and, when certain conditions are met, sends information and/or data to the EGM 10 to cause it to perform certain functions.

In a more detailed example, suppose a player is playing an EGM 10 coupled to the MID 20 and the bonus controller 40 described above. The player inserts a player tracking card so the gaming network 50 knows the player identity. The MID 20 also stores such identifying information, or perhaps stores only information that the player is a level-2 identified player, for instance. The MID 20 passes such information to the bonus controller 40, which has been programmed to provide a welcome-back bonus to any level-2 player after he or she has played two games. Gameplay on the EGM 10 continues and, after the player plays two games, the bonus controller 40 instructs the EGM 10 to add an additional 40 credits to the EGM 10 as the welcome-back bonus. Such monitoring and control of the EGM 10 can occur in conjunction with, but completely separate from any player tracking or bonusing function that is already present on the gaming network 50. In other words, the server 60, when structured at least in part as a bonusing server, may be set to provide a time-based bonus of 10 credits for every hour played by the player of the EGM 10. The above-described welcome-back bonus may be managed completely separately through the bonus controller 40 and MID 20. Further, all of the actions on the EGM 10 caused by the bonus controller 40 are also communicated to the standard accounting, tracking, and other systems already present on the gaming network 50.

Figure 2:
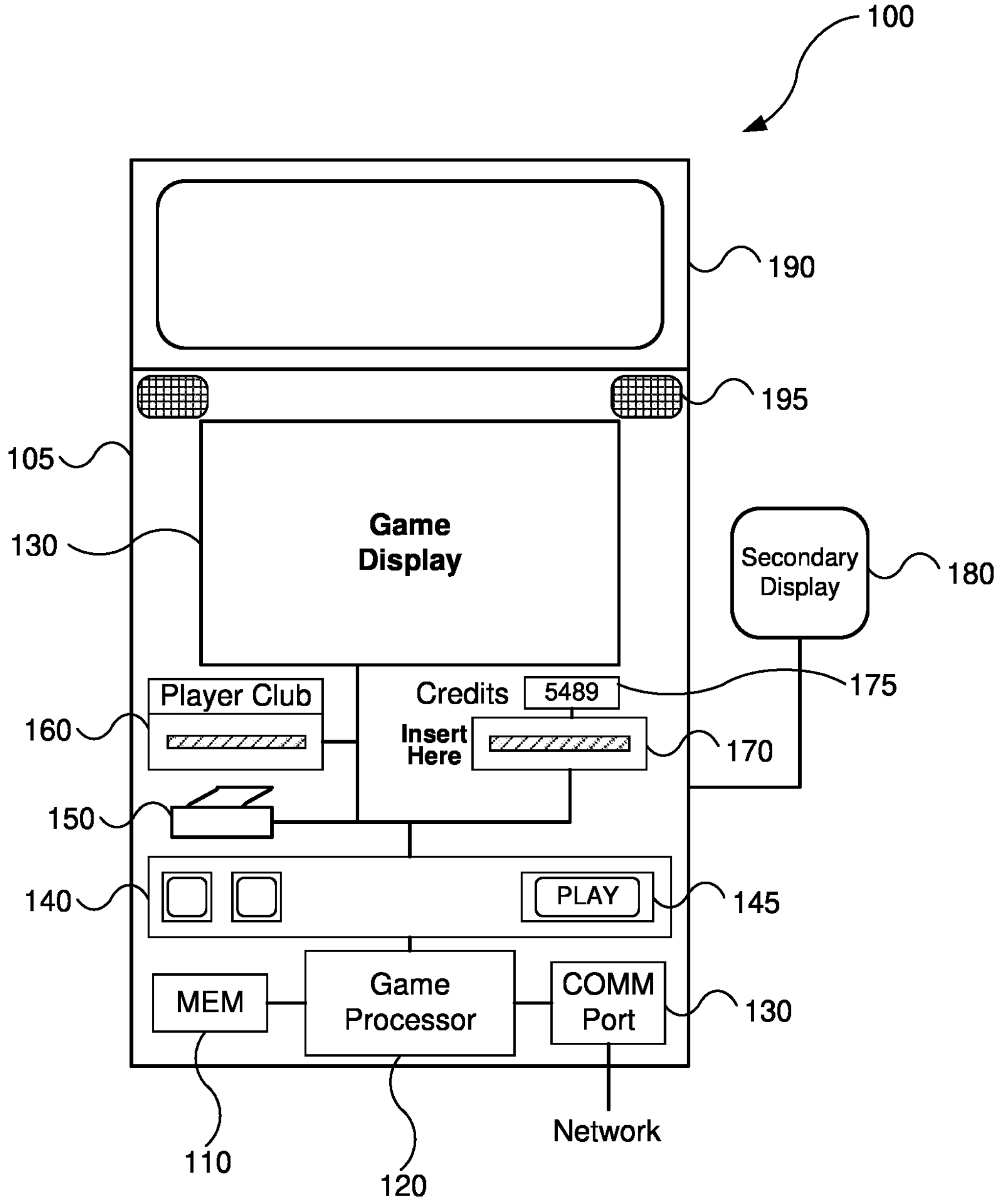
FIG. 2 is a functional block diagram that illustrates an example gaming device that can be a part of the gaming system shown in FIG. 1.

FIG. 2 is a functional block diagram that illustrates an example gaming device that can be a part of the gaming system shown in FIG. 1. Referring to FIG. 2, the illustrated gaming device 100 is an example of the EGMs 10, 12 that are shown in FIG. 1. These EGMs 10, 12 may include all types of electronic gaming machines, such as physical reel slot machines, video slot machines, video poker gaming devices, video blackjack machines, keno games, and any other type of devices may be used to wager monetary-based credits on a game of chance. As mentioned above, various other types of gaming devices may be connected to the network 50 (FIG. 1) such as wireless gaming devices 36, computers used for gaming purposes 72, cellular phones 34, multi-player gaming stations, server-based gaming terminals, etc.

Returning to FIG. 2, the illustrated gaming device 100 includes a cabinet 105 to house various parts of the gaming device 100, thereby allowing certain components to remain securely isolated from player interference, while providing access to player input/output devices so that the player may interact with the gaming device. The securely housed components include the game processor 120, memory 110, and connection port 130. The game processor 120, depending on the type of gaming device 100, may completely or partially control the operation of the gaming device. For example, if the gaming device 100 is a standalone gaming device, game processor 120 may control virtually all the operations of the gaming device and attached equipment. In other configurations, the game processor 120 may implement instructions generated by or communicated from a remote server (e.g., server 60 shown in FIG. 1) or another controller. For example, the game processor 120 may be responsible for running a base game of the gaming device 100 and executing instructions received over the network 50 from a bonus server or player tracking server. In a server-based gaming environment, the game processor 120 may simply act as a terminal to perform instructions from a remote server that is running game play on the gaming device 100. The functions implemented by the processor might also be distributed among several processors.

The memory 110 is connected to the game processor 120 and may be configured to store various game information about gameplay or player interactions with the gaming device 100. This memory may be volatile (e.g., RAM), non-volatile (e.g., flash memory), or include both types of memory. The connection port 130 is also connected to the game processor 120. This connection port 130 typically connects the gaming device 100 to a gaming network, such as the gaming network 50 described above. The connection port 130 may be structured as a serial port, parallel port, Ethernet port, optical connection, wireless antenna, or any other type of communication port used to transmit and receive data. Although only one connection port 130 is shown in FIG. 1, the gaming device 100 may include multiple connection ports. As described above, in many existing gaming devices, this connection port 130 is a serial connection port utilizing a SAS protocol to communicate to one or more remote game servers, such as player tracking servers, bonus servers, accounting servers, etc.

The player input/output devices housed by the gaming cabinet 105 include a game display 107, a button panel 140 having one or more buttons 145, a ticket printer 150, a bill/ticket reader 170, a credit meter 175, a player club interface device 160, and one or more game speakers 195. Various gaming devices may include fewer or more input/output devices (e.g., a game handle, a coin acceptor, a coin hopper, etc.) depending upon the configuration of the gaming device.

The gaming display 107 may have mechanical spinning reels, a video display, or include a combination of both spinning reels and a video display, or use other methods to display aspects of the gameplay to the player. If the gaming display 107 is a video display, the gaming display may include a touch screen to further allow the player to interact with game indicia, soft buttons, or other displayed objects. The button panel 140 allows the player to select and place wagers on the game of chance, as well as allowing the player to control other aspects of gaming. For example, some gaming devices allow the player to press a button 145 to signal that he or she requires player assistance. Other buttons may bring up a help menu and/or game information. The buttons 145 may also be used to play bonuses or make selections during bonus rounds.

Ticket printers 150 have relatively recently been included on most gaming devices to eliminate the need to restock coin hoppers and allow a player to quickly cash-out credits and transfer those credits to another gaming device. The tickets can also typically be redeemed for cash at a cashier cage or kiosk. The ticket printers are usually connected to the game processor and to a remote server, such as a TITO server to accomplish its intended purpose. In gaming devices that have more than one peripheral device, and which include only a single SAS port, the peripheral devices all share communication time over the connection port 130.

Another peripheral device that often requires communication with a remote server is the player club interface device 160. The player club interface device 160 may include a reader device and one or more input mechanisms. The reader is configured to read an object or indicia identifying the player. The identifying object may be a player club card issued by the casino to a player that includes player information encoded on the card. Once the player is identified by a gaming device, the player club interface device 160 communicates with a remote player server through the connection port 130 to associate a player account with the gaming device 100. This allows various information regarding the player to be communicated between the gaming device 100 and the player server, such as amounts wagered, credits won, and rate of play. In other embodiments, the card reader may read other identifying cards (such as driver licenses, credit cards, etc.) to identify a player. Although FIG. 2 shows the reader as a card reader, other embodiments may include a reader having a biometric scanner, PIN code acceptor, or other methods of identifying a player to pair the player with their player tracking account. As is known in the art, it is typically advantageous for a casino to encourage a player to join a player club since this may inspire loyalty to the casino, as well as give the casino information about the player's likes, dislikes, and gaming habits. To compensate the player for joining a player club, the casino often awards player points or other prizes to identified players during game play.

Other input/output devices of the gaming device 100 include a credit meter 175, a bill/ticket acceptor 170, and speakers 195. The credit meter 175 generally indicates the total number of credits remaining on the gaming device 100 that are eligible to be wagered. The credit meter 175 may reflect a monetary unit, such as dollars, or an amount of credits, which are related to a monetary unit, but may be easier to display. For example, one credit may equal one cent so that portion of a dollar won can be displayed as a whole number instead of decimal. The bill/ticket acceptor 170 typically recognizes and validates paper bills and/or printed tickets and causes the game processor 120 to display a corresponding amount on the credit meter 175. The speakers 195 play auditory signals in response to game play or may play enticing sounds while in an "attract-mode," when a player is not at the gaming device. The auditory signals may also convey information about the game, such as by playing a particularly festive sound when a large award is won.

The player may initially insert monetary bills or previously printed tickets with a credit value into the bill acceptor 170. The player may also put coins into a coin acceptor (not shown) or a credit, debit, or casino account card into a card reader/authorizer (not shown). In other embodiments, stored player points or special 'bonus points' awarded to the player or accumulated and/or stored in a player account may be able to be substituted at or transferred to the gaming device 100 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the way wager value-input is accomplished.

The gaming device 100 may include various other devices to interact with players, such as light configurations, top box displays 190, and secondary displays 180. The top box display 190 may include illuminated artwork to announce a game style, a video display (such as an LCD), a mechanical and/or electrical bonus display (such as a wheel), or other known top box devices. The secondary display 180 may be a vacuum fluorescent display (VFD), a liquid crystal display (LCD), a cathode ray tube (CRT), a plasma screen, or the like. The secondary display 180 may show any combination of primary game information and ancillary information to the player. For example, the secondary display 180 may show player tracking information, secondary bonus information, advertisements, or player selectable game options. The secondary display may be attached to the game cabinet 105 or may be located near the gaming device 100. The secondary display 180 may also be a display that is associated with multiple gaming devices 100, such as a bank-wide bonus meter, or a common display for linked gaming devices.

In operation, typical play on a gaming device 100 commences with a player placing a wager on a game to generate a game outcome. In some games, a player need not interact with the game after placing the wager and initiating the game, while in other games, the player may be prompted to interact with the gaming device 100 during game play. Interaction between the player and the gaming device 100 is more common during bonuses, but may occur as part of the game, such as with video poker. Play may continue on the gaming device 100 until a player decides to cash out or until insufficient credits remain on the credit meter 175 to place a minimum wager for the gaming device.

Communication between gaming devices, such as those described above, and other devices on gaming systems 2 (FIG. 1) is becoming increasingly more complex. The below-described system illustrates a system and method of communication on modern and future gaming systems.

Figure 3A:
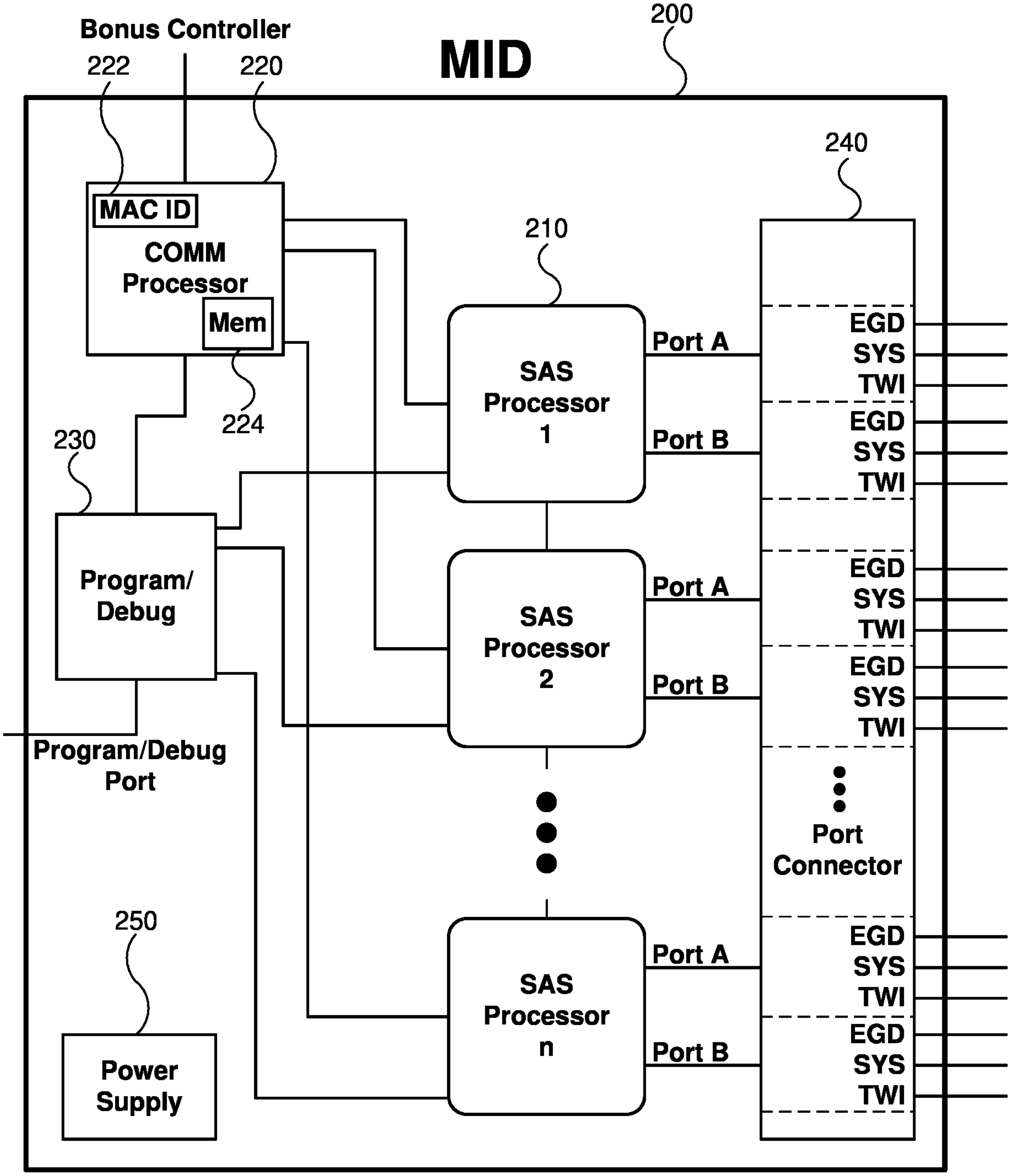
FIG. 3A is a block diagram of an example machine interface device shown in FIG. 1 according to embodiments of the invention.

FIG. 3A is a block diagram of a MID 200, which may be an example of the MID 20 described with reference to FIG. 1 above. The MID 200 includes a set of processors 210, which in this example are termed SAS processors. These SAS processors are capable of accepting, manipulating, and outputting data on a SAS protocol network.

The MID 200 is capable of communicating using other communication protocols as well, as described below. Each processor 210 is structured to couple to two Electronic Gaming Devices (EGDs). EGDs may include, for example, gaming devices such as EGM 10 of FIG. 1, or other electronic gaming devices. In the illustrated embodiment, each SAS processor 210 includes two ports, A and B, each of which may be coupled to an EGD. In turn, the two ports A and B are attached to a set of physical connectors, illustrated here as a single connector 240 for convenience of explanation. Each section of the physical connector 240, delineated by dotted lines, includes three separate pairs of communication lines. Each pair of communication lines is illustrated as a single line—a first serial pair labeled EGD, a second serial pair labeled SYS, and a third communication pair that uses two-wire communication, labeled TWI. Note that each of the ports A and B of the SAS processor 210 includes all three communication pairs. Additionally, each of the sections of the physical connector 240 includes wires for a voltage and ground reference, though not depicted in FIG. 3A. In an embodiment of the MID 200 with four SAS processors 210, the physical connector 240 includes up to eight sections, each of which may be embodied by a separate, standard, RJ-45 connector to couple to a matching RJ-45 port in the connected EGM 10, or EGD, as determined by the specific implementation.

As illustrated in FIG. 3A, the first serial pair of Port A couples to EGD. The second serial pair may be coupled to external devices connected to the EGD, as needed. Specifically, some serial data protocols, such as SAS, do not allow EGMs 10 to interface with multiple external devices over a single serial communication path. Such external devices may include, for example, player tracking systems and accounting systems. If a particular EGM 10 is already connected to such a system, and thus its SAS port is "full," the MID 200, and in particular a SAS processor 210, may insert itself "between" the connected system and the EGM 10 by using both of the serial pairs in a particular port of the SAS processor 210 to couple to the EGM 10 and the other connected system, respectively. In operation, the MID 200, through the respective SAS processor 210, passes any information directed from the external device coupled to the SYS communication lines in a particular port to the EGD of the same port, or vice-versa, in real time and without interruption. For example, polls, requests for information, and transmission of information are passed from a connected player tracking system, through the SYS lines of Port A to the serial line EGD of Port A. Only a small communication delay is added using such a communication system, which is well within the tolerance limits of SAS protocol. As a result, both the EGM 10 and external system behave as if the MID 200 were not present.

Further, the third communication pair, a two-wire interface labeled TWI, presents opportunity for expansion to future systems installed on the EGM 10, or a new EGM, so that any data may be communicated between the EGM 10 and the MID 200. The TWI may be connected to card readers, top boxes, ticket dispensers, lighting panels, etc. that are coupled to or work in conjunction with an EGM 10.

Besides simply passing information between communication interfaces, the MID 200 also generates information directly for connected EGDs, which may originate from the MID 200 or from another device as described below. In such a case the SAS processor 210 sends the appropriate data through its appropriate serial line or two-wire interface directly to the desired EGD. Then the EGD may send its own data to its connected peripheral.

Referring back to FIG. 3A, the MID 200 additionally includes a communication processor 220, labeled as COMM processor. The communication processor 220 is coupled to each of the SAS processors 210, a program/debug circuit 230, and to a bonus controller 40 (FIG. 1). In practice, the communication processor 220 may be embodied by a small microprocessor, such as the Atmel ATXMEGA256A3, which is readily available to developers, or any other processor or system capable of performing the desired communication functions.

The communication processor 220 collects and aggregates information from the EGDs that are coupled to each of the SAS processors 210 and sends the aggregated information to the bonus controller 40 of FIG. 1. In some embodiments the communication processor 220 is coupled to the bonus controller 40 through an Ethernet interface. The communication processor is structured to parse information from Ethernet data packets and collect it for use by other systems within the MID 200. Because Ethernet is an addressed protocol, by which messages may be sent to a particular Ethernet address, the communication processor 220 also includes an address of the Ethernet device in a MAC ID 222.

The communication processor 220 may also accept information from the bonus controller 40, or other connected devices, and pass such information to the EGDs coupled to the SAS processors 210. The information may include data, instructions, or commands, for instance.

A memory 224, which may be, for instance Ferroelectric Random Access Memory (FRAM) capable of retaining stored contents for over 10 years may be used by the communication processor for both program and data storage. Of course, other memory technologies may be used instead of or in addition to FRAM.

A program/debug circuit 230 in the MID 200 connects to the communication processor 220 as well as to each of the SAS processors 210. During manufacture of the MID 200, the programming functions of the program/debug circuit 230 load program code to each of the SAS processors 210 as well as the communication processor 220. This initial loading may take place through a program/debug communication port. Further, the program codes stored in each of the SAS processors 210 and the communication processor 230 may be updated through commands and data sent from an external device, such as the bonus controller 40, through the communication processor 220 to the program/debug circuit 230. The program/debug circuit 230 then formats the updated program data for each of the connected SAS processors 210 and communication processor 220, and sends a command to each of the processors to be updated to load the new program code.

Figure 3B:
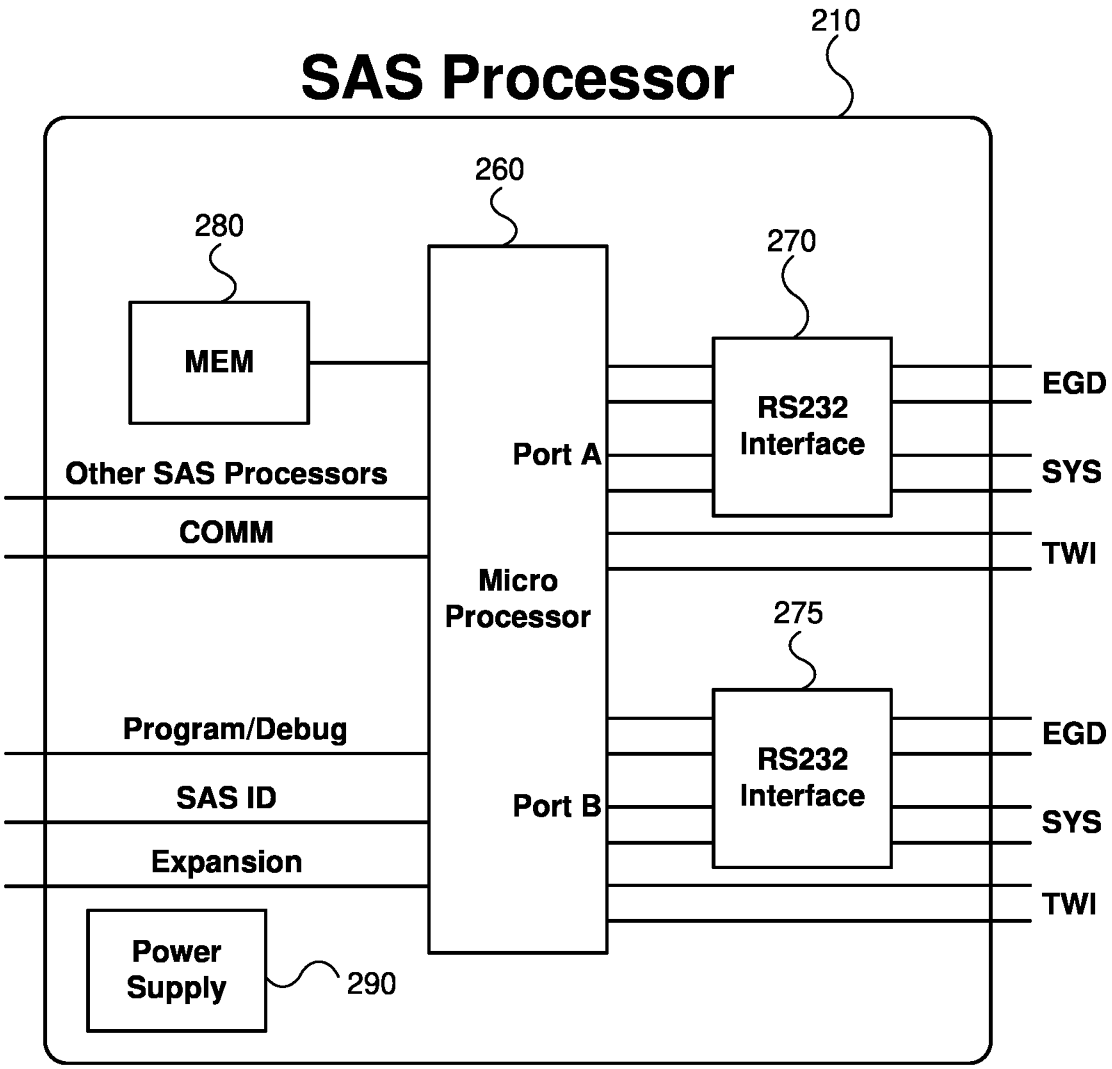
FIG. 3B is a block diagram of an example processor in the machine interface device illustrated in FIG. 3A according to embodiments of the invention.

FIG. 3B is a block diagram of one of the SAS processors 210 of FIG. 3A, which shows additional detail of the SAS processor.

As described above, each of the SAS processors 210 include two separate ports, Port A and Port B, illustrated here as separate ports of a microprocessor 260. The microprocessor 260 in the SAS processor 210 may be embodied by an Atmel ATXMEGA256A3, as described above.

Each of the ports of the microprocessor 260 is structured to couple to an EGD, which may be an EGM 10 of FIG. 1. Each port of the microprocessor 260 includes two serial connections, which in the example embodiment illustrated in FIG. 3B, are RS-232 ports common in the computing industry. The RS-232 ports are contained in an RS-232 interface 270, 275, one for each port of the microprocessor 260. Each of the interfaces 270, 275 includes two separate RS-232 ports, each of which uses a separate transmit and receive wire. Thus, each interface 270, 275 includes a total of four wires. It is convenient to include RS-232 ports as the preferred mode of communication because it is the standard interface for SAS ports of the EGMs 10. In non-standard EGMs 10, such as very old or future devices that may not include SAS ports, communication ports other than RS-232 may be used simply by exchanging or updating the RS-232 interfaces 270, 275. Another possibility is to include an RS-232 translator in any EGM 10 that does not include its own RS-232 interface. As illustrated in FIG. 3B, and as described above, the first of the serial connections, labeled EGD, is connected to an EGD for the particular port of the microprocessor 260, while the second serial connection, labeled SYS is connected to external devices that may be coupled to the particular EGD.

Additionally, and as described above, each SAS processor 210 includes two, two-wire interfaces, illustrated as a separate interface pair and labeled as TWI. In this embodiment, there is one pair for each port of the microprocessor 260. Each two-wire interface creates a bi-directional serial port that may be used for communicating with peripheral or expansion devices associated with the EGD of the particular microprocessor 260, or with other devices on the gaming system 2 of FIG. 1.

The SAS processor 210 includes a memory 280 for storing instruction data of the microprocessor 260 as well as providing data storage used by the SAS processor. The memory 280 is preferably non-volatile memory, such as FRAM that is connected to the microprocessor 260 through a serial interface.

As described above, the SAS processor 210 of the MIB 200 (FIG. 3A) includes multiple connections to other components in the MIB 200, which are illustrated in detail in FIG. 3B. Initially, each SAS processor 210 is coupled to each of the other SAS processors 210 in the MIB 200. In practice, this may be accomplished by a direct connection, in which each microprocessor 260 is directly coupled to one another, or such connection may be an indirect connection. In an indirect connection, the microprocessors 260 of each SAS processor 210 is coupled to the communication processor 220 (FIG. 3A). Any data or information to be shared between SAS processors 210 is then originated by or passed through the communication processor 220 to the other SAS processors.

Similarly, as described above, the microprocessor 260 of each SAS processor 210 is coupled to a program/debug circuit 230 for initial or later programming. To communicate with each SAS processor 210 individually, each SAS processor is given an individual identification number, which may be set for the microprocessor 260 by tying particular data pins of the microprocessor to permanent low or high signals. Using binary encoding, n individual lines are used to identify 2n separate processors. A set of expansion pins couples to the microprocessor 260 of each SAS processor 210 so that each processor may determine system identification and revisions of the MIB 200 and the connected bonus controller 40.

Figure 4:
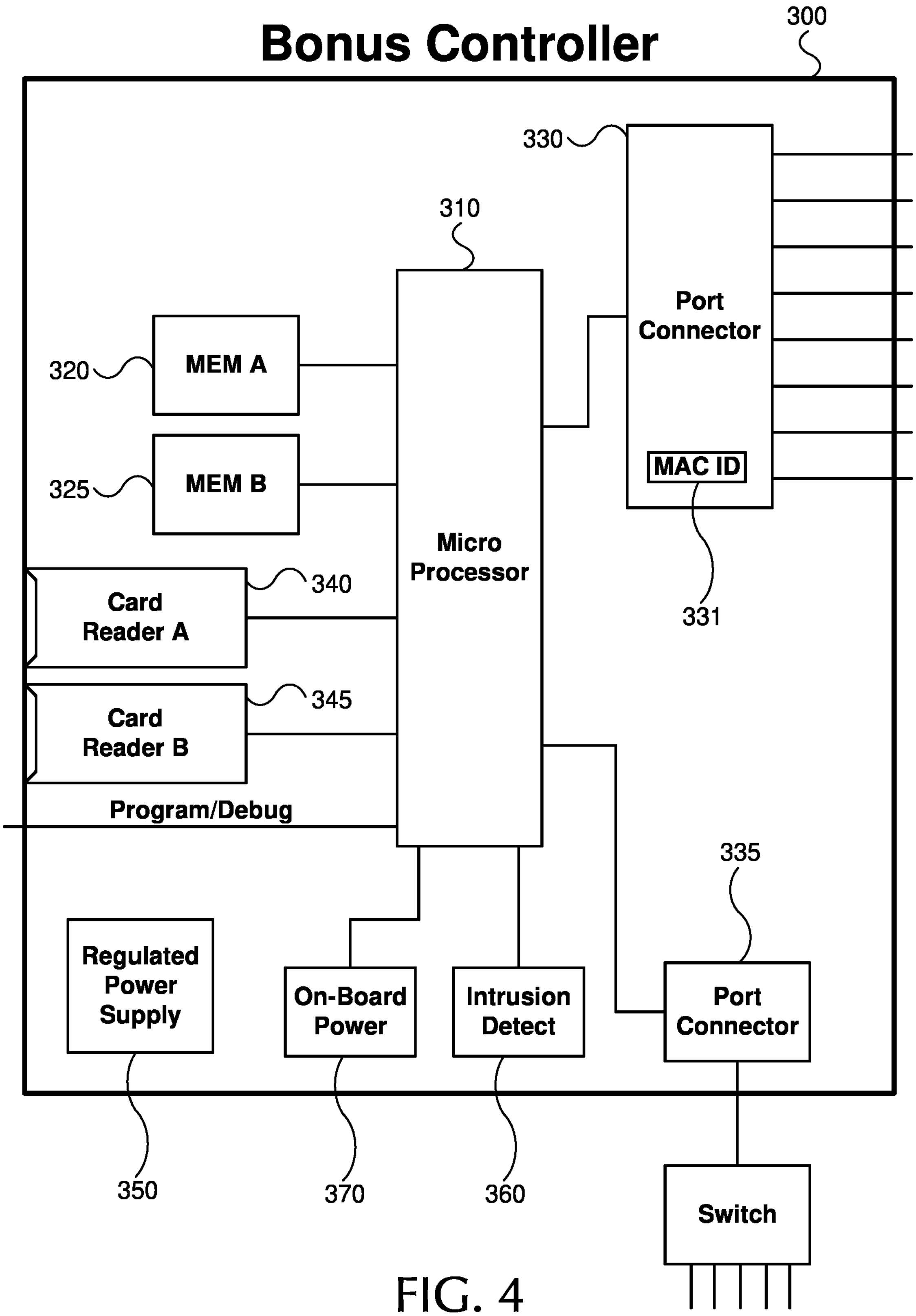
FIG. 4 is a block diagram of an example bonus controller shown in FIG. 1 according to embodiments of the invention.

With reference back to FIG. 1, recall that the bonus controller 40 couples to each of the MIDs 200, and by extension to their coupled EGDs, such as EGMs 10, and possibly to one or more EGMs themselves, to cause data and commands to be sent to the EGMs to control functions on each EGM. FIG. 4 is a detailed block diagram of such a bonus controller, according to embodiments of the invention.

A bonus controller 300 of FIG. 4 may be an embodiment of the bonus controller 40 illustrated in FIG. 1. Central to the bonus controller 300 is a microprocessor 310, which may be an Atmel AT91SAM9G20, which is readily available to developers. The microprocessor 310 is coupled to one or more memory systems 320, 325. A memory system 320 is a 2 Megabyte FRAM while memory system 325 is a 64 Megabyte Synchronous DRAM (SDRAM). Each memory system 320, 325 has various advantages and properties and is chosen for those properties. FRAM maintains its data autonomously for up to ten years, while SDRAM is relatively fast to move data into and out of, as well as being relatively inexpensive. Of course, the sizes and types of memory included in any bonus controller according to embodiments of the invention may be determined by the particular implementation.

The microprocessor 310 also couples to a pair of card readers, 340, 345, which are structured to accept easily replaceable, portable memory cards, as are widely known. Each card reader may further include Electro-Static Discharge (ESD) devices to prevent damage to internal circuitry, such as the microprocessor 310, when cards are inserted or removed from the card readers 340, 345. In practice, a card in one of the card readers 340, 345 may store program code for the microprocessor 310 while a card in the other reader may store data for use by the bonus controller 300. Alternatively, a single card in either of the card readers 340, 345 may store both program and data information.

A port connector 330 includes multiple communication ports for communicating with other devices. With reference back to FIG. 3A, the communication processor of each MID 200 couples to a connected bonus controller through such a communication port. The communication port 330 is preferably an Ethernet interface, as described above, and therefore additionally includes a MAC address 331. The port connector 330 includes multiple separate connectors, such as eight, each of which connect to a single MID 20 (FIG. 1), which in turn connects to up to eight separate EGMs 10. Thus, a single bonus controller 300 may couple to sixty-four separate EGMs by connecting through appropriately connected MIDs.

Further, a second port connector 335 may be included in the bonus controller 300. The second port connector may also be an Ethernet connector. The purpose of the second port connector 335 is to allow additionally connectivity to the bonus controller 300. In most embodiments the second port connector 335 may couple to another bonus controller 300 or to other server devices, such as the server 60 on the gaming network 50 of FIG. 1. In practice, the second port connector 335 may additionally be coupled to a MID 20, thus providing the bonus controller 300 with the ability to directly connect to nine MIDs 20.

Yet further, Ethernet connections are easily replicated with a switch, external to the bonus controller 300 itself, which may be used to greatly expand the number of devices to which the bonus controller 300 may connect.

Because the bonus controller 300 is intended to be present on a gaming network 50, and may be exposed to the general public, systems to protect the integrity of the bonus controller 300 are included. An intrusion detection circuit 360 signals the processor 310 if a cabinet or housing that contains the bonus controller 300 is breached, even if no power is supplied to the bonus controller 300. The intrusion detection circuit may include a magnetic switch that closes (or opens) when a breach occurs. The microprocessor 310 then generates a signal that may be detected on the gaming network 50 indicating that such a breach occurred, so that an appropriate response may be made. An on-board power circuit 370 may provide power to the bonus controller 300 for a relatively long time, such as a day or more, so that any data generated by the processor 310 is preserved and so that the processor 310 may continue to function, even when no external power is applied. The on-board power circuit 370 may include an energy-storing material such as a battery or a large and/or efficient capacitor.

Similar to the microprocessor processor 260 of the SAS processor 210 described above, the microprocessor 310 of the bonus controller 300 is additionally coupled to a program/debug port for initially programming the microprocessor 310 during production, and so that program and/or other data for the microprocessor may be updated through the program/debug port.

In operation the bonus controller 300 configures and controls bonus features on gaming devices through a gaming network 50 or through other communication systems. Bonus features are implemented through each gaming device's internal structure and capabilities, and may include integration with additional peripheral devices. Bonusing programs for the connected games may be introduced to the bonus controller 300 by updating data stored in the memory systems directly on the bonus controller, or by inserting new memory cards in one or more of the card readers 340, 345. Such a platform provides a facility for game developers, even third-party developers, to define and program new types of bonus games that may be used in conjunction with existing EGMs on existing gaming networks, or on new games and new networks as they are developed.

Figure 5A:
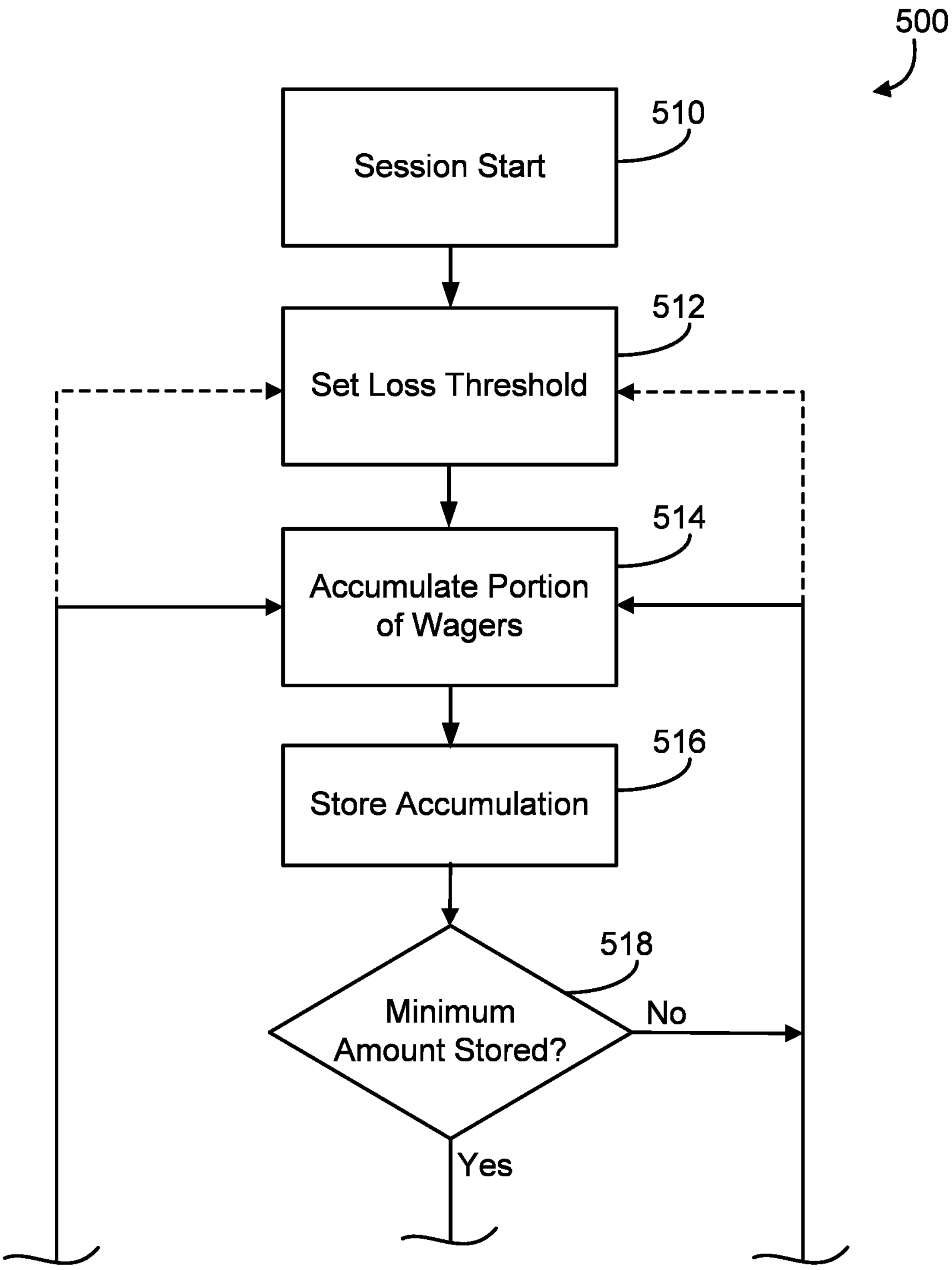
FIGS. 5A and 5B depict a flow chart for embodiments of the invention.
Figure 5B:
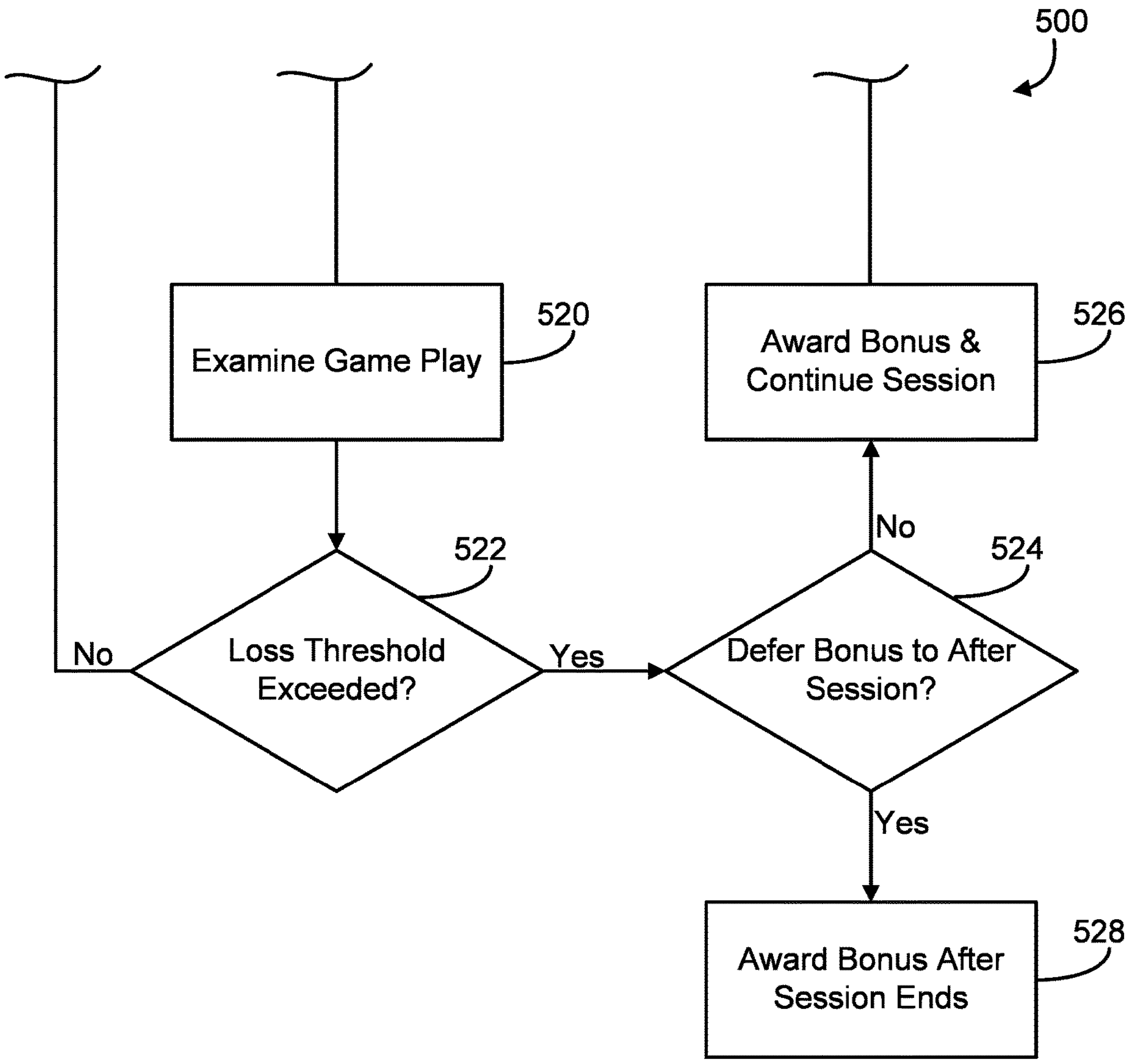

FIGS. 5A and 5B depict a process indicated generally at 500 that shows embodiments of the invention. Process 510 is shown for only a single play session on an electronic gaming machine, but a session might comprise multiple sessions at different machines on the same visit to a casino, multiple sessions at different properties, or multiple sessions on multiple visits to a casino, or any combination thereof.

The loss threshold is set at 512. This might be a defined threshold that is associated with the player's account, it might be set based on the player's volatility preference, which is determined or estimated after the session start, or it could initially be set at predetermined level. Or it could be set at a level that is uniquely chosen for each customer, either in accordance with the player's historical play or in accordance with the player's perceived worth to the casino. In other words, the threshold could be set before or after the session starts.

Loss threshold 512 could be determined in a number of ways. For example, the loss threshold might comprise a consecutive number of losses, referred to herein as a streak. A streak of losses includes each loss immediately after a win up until the next win occurs. Or it might comprise a number of plays with no wins above a determined amount. Or it could comprise a plurality of streaks of losses or a plurality of streaks of no wins above a determined amount. Or it could comprise sequences of wagers of size that exceeds amounts won from those wagers. Or it could comprise wagers that exceed wins over any group of wagers, associated by time, bet size, gaming machine played or gaming type played.

In one embodiment, At 514, a portion of the player's wagers is accumulated in a pool associated with the player in the system, e.g., in the player's account. This could be a defined percentage of each wager made during the session. At 516, the accumulated amount of the pool is stored.

It is desirable to set a defined minimum amount of the stored accumulation before providing an award to the player from the pool to avoid very small awards, which might not be well received by the player. At 518, the system checks to see if this minimum amount has been accumulated. If not, the process returns to 514 where gaming and accumulation of a portion of wagers continues. Alternatively, the process might return to set the loss threshold at 512, indicated by the dashed line, to adjust the threshold during play. For example, if the system determines, based on player behavior observed during play, that a relatively small award might be appreciated by the player, the threshold could be lowered.

It can be seen that setting either or both of the loss threshold and the minimum amount stored affect volatility of the total amount of awards to the player. Allowing the pool to accrue to a large amount, by setting the minimum amount stored in the pool accordingly, could result in a larger award from the pool. Adjusting the loss threshold affects the frequency of any bonus award from the pool. Together these variables can be adjusted to match the player's volatility preference, as expressed by the player or as inferred from player behavior during play.

In another embodiment, the bonus awarded in FIG. 5B does not require a minimum accumulation at 518 in FIG. 5A. For example, an operator of electronic gaming machines on which process 500 is implemented might decide to permit the bonus award for a specific player, for a group or groups of players with similar characteristics, or for all players even though there is not a minimum accumulation. This separate funding, i.e., apart from the accumulated wagers, could come from the operator's marketing budget. There are common instances where an operator might wish to favor a player or players in this manner. For example, the operator might wish to so favor all new players, e.g., new members of the players' club, to provide them with a satisfying gaming experience early in their players' club membership. Or the operator might wish to provide this benefit to the companion of an important player. It could also be done based on time of day, day of week, holidays, or on a player's birthday.

This benefit can be done in tandem with awarding bonuses from the stored accumulation of the player's wagers. In other words, when the minimum amount is stored at 518 and the loss threshold is exceeded at 522, the player receives the bonus in FIG. 5B even though the player is also being bonused as described above from the marketing pool. Or accumulation of wagers could be temporarily suspended while the marketing bonus is in effect.

In still another embodiment process 500 could be adjusted to implement the bonus award for a player or group of players whose loss threshold, at 522, is not exceeded but who are not experiencing adequate wins. For example, the loss threshold could be set as a positive amount of money won by the player. One instance in which an operator might want to do this is with a player who typically wagers large amounts or is a new player but known as one who wagers large amounts. Such player might, e.g., wager $25,000 but only have $500 in wins. This adjustment could be made automatically by the process based on the player's historical play or might be set manually by the operator.

In addition, the loss threshold could be adjusted, manually or under control of an algorithm, up or down based on time. Certain times of the week or hours of the day are known for low play on a casino floor, e.g., Thursday morning. This would be an inducement to attract play during those times. It could further be so adjusted based on a player's birthday, a holiday, or the existence of nearby events that compete for players' attendance.

It should be appreciated that any adjustment to the loss threshold may be made algorithmically, under control of process 500, or manually by an operator input.

If the minimum amount is stored at 518, the process proceeds to 520 in FIG. 5B where game play is examined. Preferably, game play is tracked as described in applicant's US Patent Application Publication 2020/0342710 A1, which is hereby incorporated by reference. This system, unlike prior art systems, captures and stores virtually all data generated by the electronic gaming machine during play. Such data includes, among other things, the time of each play of the game and its outcome. As a result, there is real-time observation of play and the ability to respond by offering bonuses during the session.

After examination of game play at 520, the process advances to determining whether the loss threshold is exceeded at 522. If not, the process returns to 514 (in FIG. 5A) where each play of the gaming machine continues to accumulate wagers. Alternatively, the process can return to 512, indicated by the dashed line in FIG. 5A, where the loss threshold can again be adjusted, either up or down depending inferences drawn from examination of game play in 520.

At 522 in FIG. 5B, if the loss threshold is exceeded, e.g., there have been a consecutive number of losses that meet the threshold, the process proceeds to 524 where it is determined whether the bonus should be deferred to the end of the session or immediately awarded. This determination can be made by the casino or by the system if inferences drawn from player behavior determine either that the player is more likely to respond well to an immediate bonus or to one at the end of the session.

At 524 if the bonus is to be awarded after the threshold is met, which could be anytime between then and the end of the session, the bonus is awarded at 526, and the process returns to 514 (in FIG. 5A) where wagers on games are again accumulated. Alternatively, the process returns to 512 (indicated by the dashed line) to adjust the threshold and then again to 514 where accumulation resumes.

The bonus awarded could be anything other than a pay from the gaming machine based on outcome randomly generated in the games pay table. Any known bonus might fall into this category. In addition, the bonus could comprise a multiple of the next win above X amount. Or it could be that the next Y wins are paid at a multiple of the normal pay for those wins. The player may be notified at the start of a bonus that it is in effect, thus creating heightened excitement around subsequent play. In another example, the bonus could be an opportunity to play a free game, with the outcome being based on the games pay table. Or it could be an award of credits to the machines credit meter. Another bonus could be an opportunity to play the game but the result is not selected randomly from the pay table. Rather in response to the player's initiation of the game, the system forces a winning outcome on the machine's display. For example, in the case of a slot machine, a winning combination of symbols are displayed under control of applicant's system and the player is awarded an amount that corresponds to the amount that the pay table would award based on a random outcome. As a result, from the player's perspective, he or she played the game, as they have been doing all along, and got a win.

Still another bonus award is the opportunity is the chance to play a bonus game. This could be a secondary game that is built into the cabinet that contains the base game played by the player. Or it could be a separate game on either the player's mobile device or on the mobile device of a casino agent. A bonus is essentially any manner in which the casino can provide a benefit to the player over and above random awards based on the pay table.

If, at 524, the bonus is awarded after the session ends the process proceeds to 528. This award could be any of the bonuses mentioned above. It could be presented at the next session the player begins, which could be the next machine he or she plays on the current visit to the casino or could be the first machine that he or she plays at a later date when the player returns to the casino or a related property. Still another possibility for awards after the session ends relates to notifications that are mailed or sent by electronic communication to the player offering a benefit on their next visit, such as free play credits or a complementary amenity.

Applicant's method and system thus provides several benefits to the operator of the gaming machines. First, because the player is accumulating his or her own wagers, the operator can fund the bonus from the player's money rather than from the casino marketing budget. Second, the technical problem related to randomness of outcomes is diminished. The player's gaming session is more satisfying to the player because long losing streaks or streaks with low win awards are offset. Third, the technical problem of volatility mismatch between the volatility designed into the gaming machine and player's preference can be tuned to match the player's preference. As a result, the player has a more satisfying gaming experience and is therefore more likely to continue play or return in the future for more play.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method comprising:

receiving, via a user interface of an electronic gaming machine, during a gaming session, one or more wagers;

accumulating, in an electronic account associated with a player of the electronic gaming machine, a bonus pool comprising a portion of each wager of the one or more wagers, wherein the electronic account indicates a player preferred volatility;

determining, via a machine interface device housed in the electronic gaming machine, one or more losing outcomes during the gaming session on the electronic gaming machine;

determining, based on the one or more losing outcomes, a gaming session volatility exceeds the player preferred volatility; and based on determining the gaming session volatility exceeds the player preferred volatility, outputting the bonus pool.

2. The method of claim 1, wherein the bonus pool comprises one or more of: funds, credits, or one or more free plays.

3. The method of claim 1, wherein the portion of each wager of the one or more wagers is a defined percentage.

4. The method of claim 1, wherein the electronic gaming machine comprises one or more of: a virtual card game, a virtual table game, or a slots game.

5. The method of claim 1, wherein the bonus pool is configured to reduce the gaming session volatility.

6. The method of claim 1, further comprising determining an amount lost exceeds a loss threshold, and wherein the loss threshold is associated with the electronic account.

7. The method of claim 1, further comprising:

receiving a player identifier;

determining, based on the player identifier, a loss threshold; and adjusting, based on the player identifier, the loss threshold.

8. One or more non-transitory computer-readable media storing processor-executable instructions thereon, which, when executed by at least one processor cause the at least one processor to:

receive, via a user interface of an electronic gaming machine, one or more wagers during a gaming session;

accumulate, in an electronic account associated with a player of the electronic gaming machine, a bonus pool comprising a portion of each wager of the one or more wagers, wherein the electronic account indicates a player preferred volatility;

determine, via a machine interface device housed in the electronic gaming machine, and one or more losing outcomes during the gaming session on the electronic gaming machine;

determine, based on the one or more losing outcomes, a gaming session volatility exceeds the player preferred volatility; and based on determining the gaming session volatility exceeds the player preferred volatility, outputting the bonus pool.

9. The one or more non-transitory computer-readable media of claim 8, wherein the bonus pool comprises one or more of: funds, credits, or one or more free plays.

10. The one or more non-transitory computer-readable media of claim 8, wherein the portion of each wager of the one or more wagers is a defined percentage.

11. The one or more non-transitory computer-readable media of claim 8, wherein the electronic gaming machine comprises one or more of: a virtual card game, a virtual table game, or a slots game.

12. The one or more non-transitory computer-readable media of claim 8, wherein the bonus pool is configured to reduce the gaming session volatility.

13. The one or more non-transitory computer-readable media of claim 8, wherein the processor-executable instructions, when executed by the at least one processor, further cause the at least one processor to determine an amount loss exceeds a loss threshold, and wherein the loss threshold is associated with the electronic account.

14. The one or more non-transitory computer-readable media of claim 8, wherein the processor-executable instructions, when executed by the at least one processor, further cause the at least one processor to:

receive a player identifier;

determine, based on the player identifier, a loss threshold; and adjust, based on the player identifier, the loss threshold.

15. An apparatus comprising:

one or more processors; and memory storing processor-executable instructions that, when executed by the one or more processors, cause the apparatus to:

receive, via a user interface of an electronic gaming machine, one or more wagers during a gaming session;

accumulate, in an electronic account associated with a player of the electronic gaming machine, a bonus pool comprising a portion of each wager of the one or more wagers, wherein the electronic account indicates a player preferred volatility;

determine, via a machine interface device housed in the electronic gaming machine, and one or more losing outcomes during the gaming session on the electronic gaming machine;

determine, based on the one or more losing outcomes, a gaming session volatility exceeds the player preferred volatility; and based on determining the gaming session volatility exceeds the player preferred volatility, outputting the bonus pool.

16. The apparatus of claim 15, wherein the bonus pool comprises one or more of: funds, credits, or one or more free plays.

17. The apparatus of claim 15, wherein the portion of each wager of the one or more wagers is a defined percentage.

18. The apparatus of claim 15, wherein the electronic gaming machine comprises one or more of: a virtual card game, a virtual table game, or a slots game.

19. The apparatus of claim 15, wherein the bonus pool is configured to reduce the gaming session volatility.

20. The apparatus of claim 15, wherein the processor-executable instructions, when executed by the one or more processors, further cause the one or more processors to determine an amount lost exceeds a loss threshold, and wherein the loss threshold is associated with the electronic account.

* * * * *